UNITED STATES PATENT OFFICE.

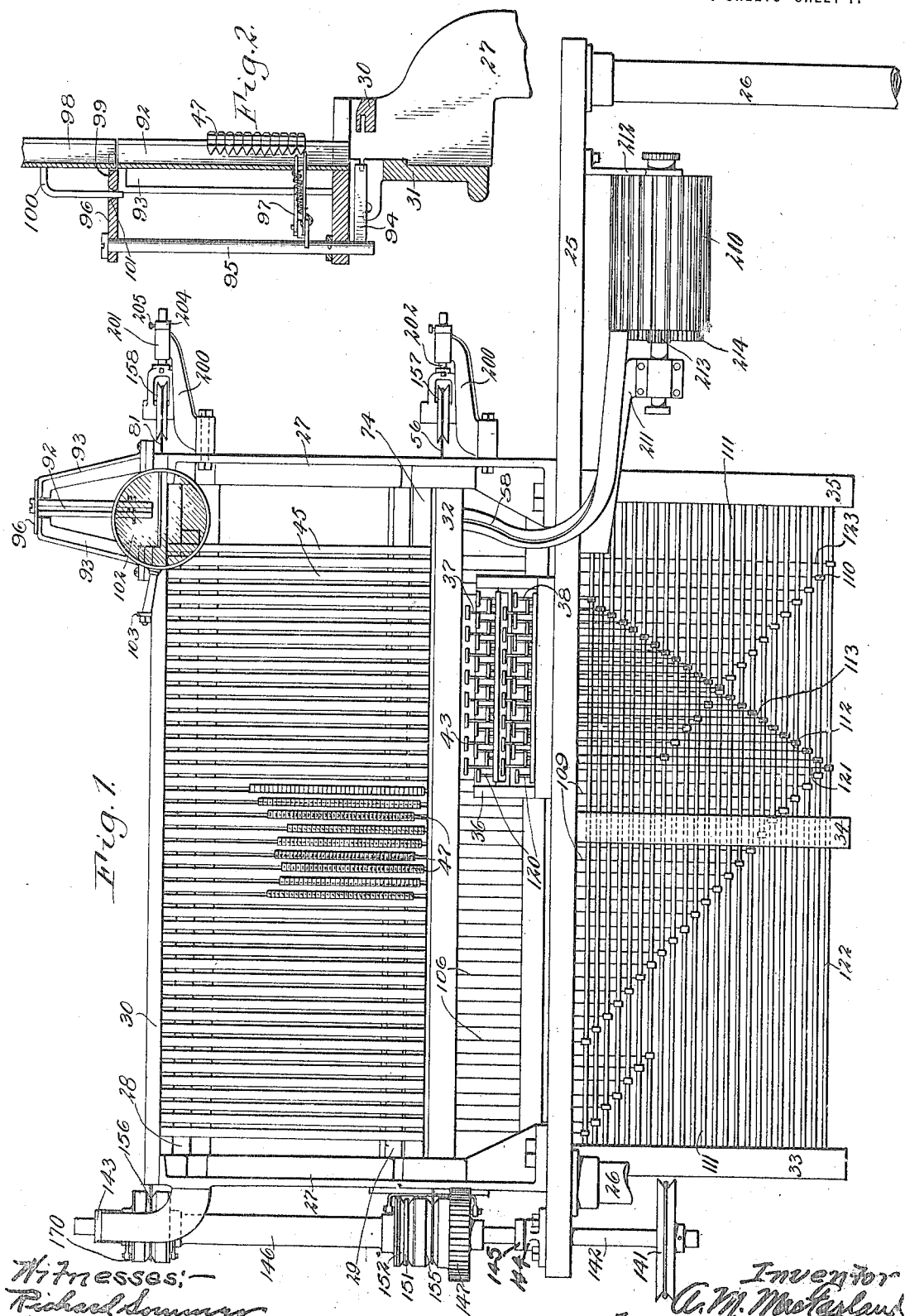

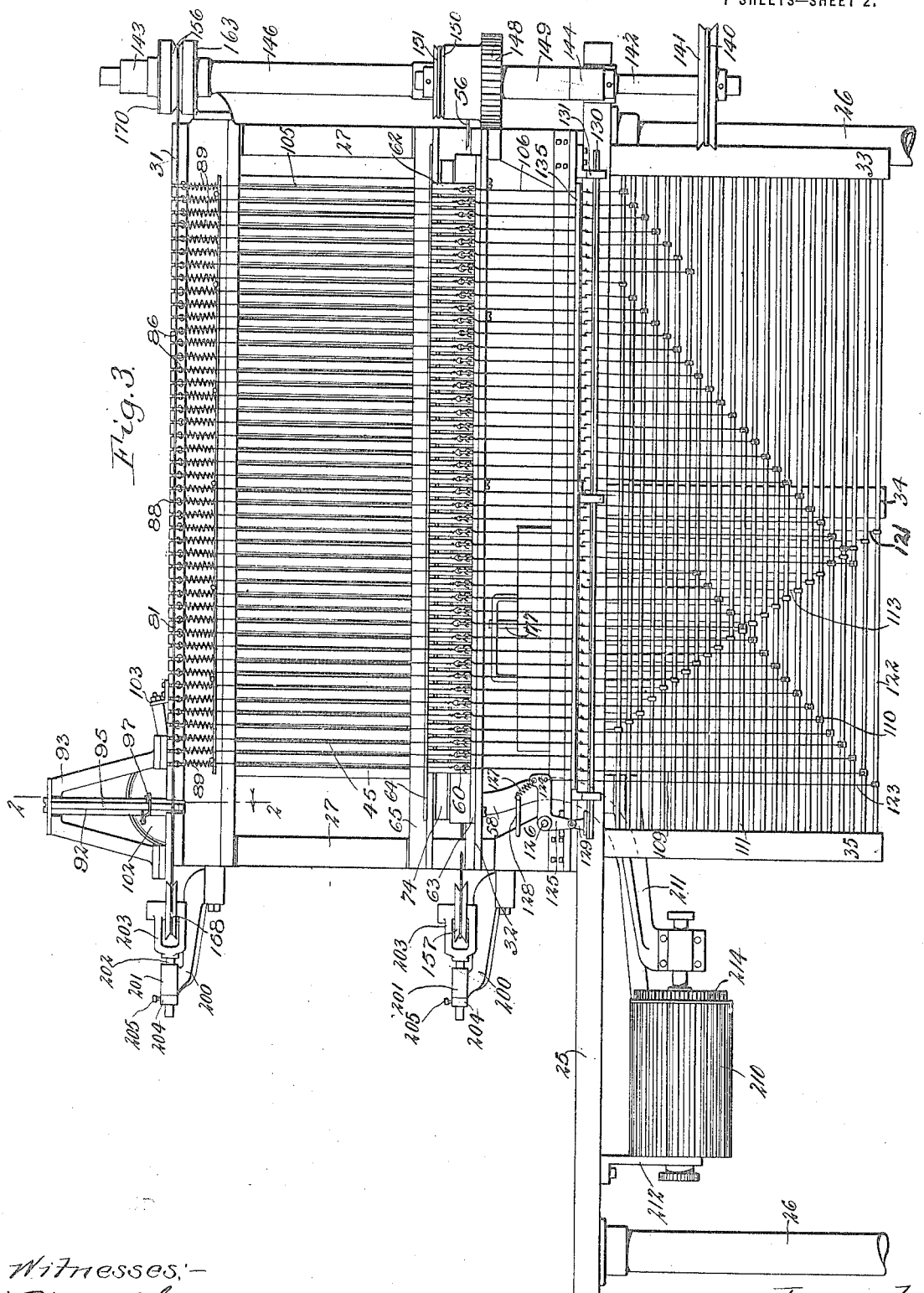

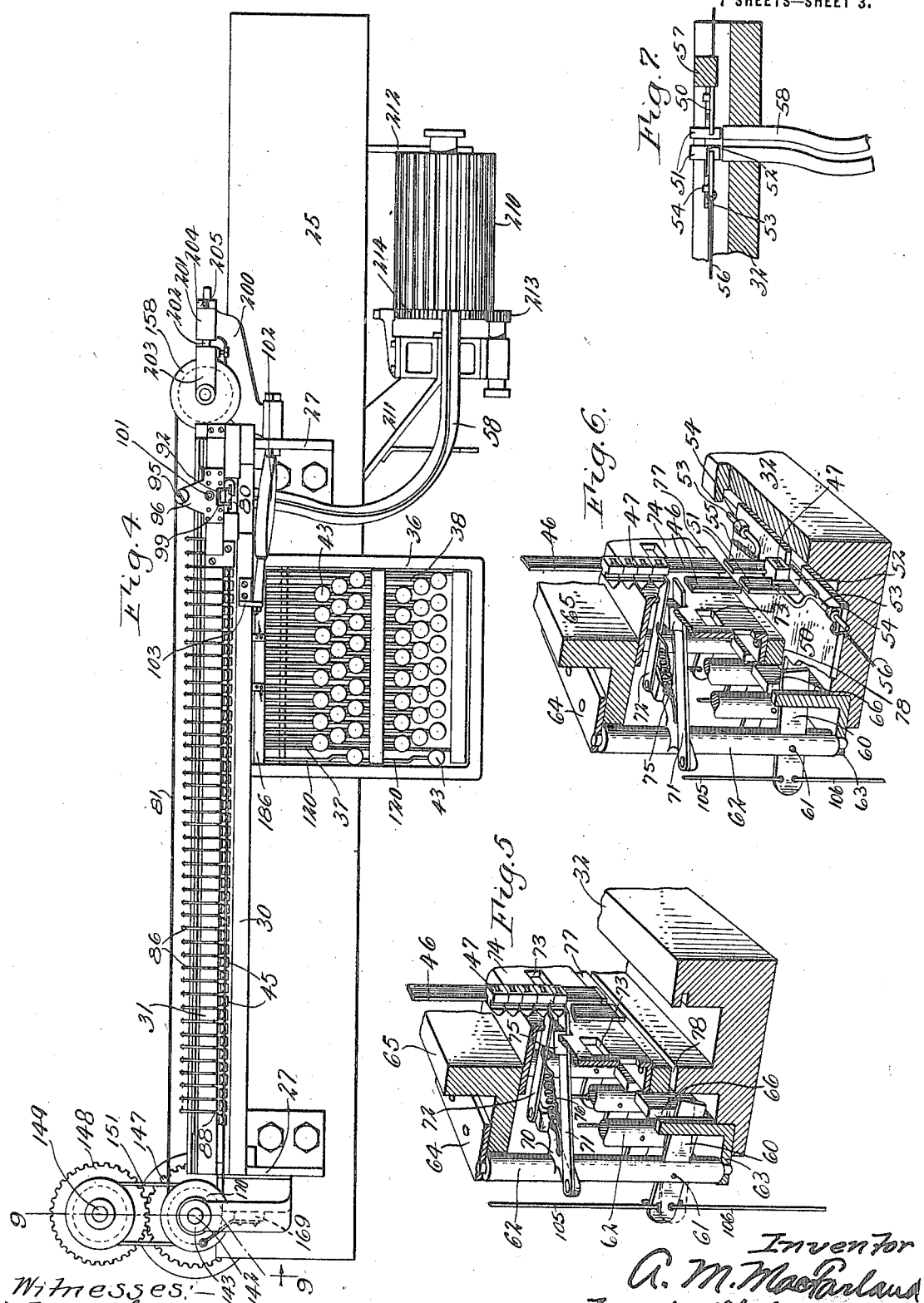

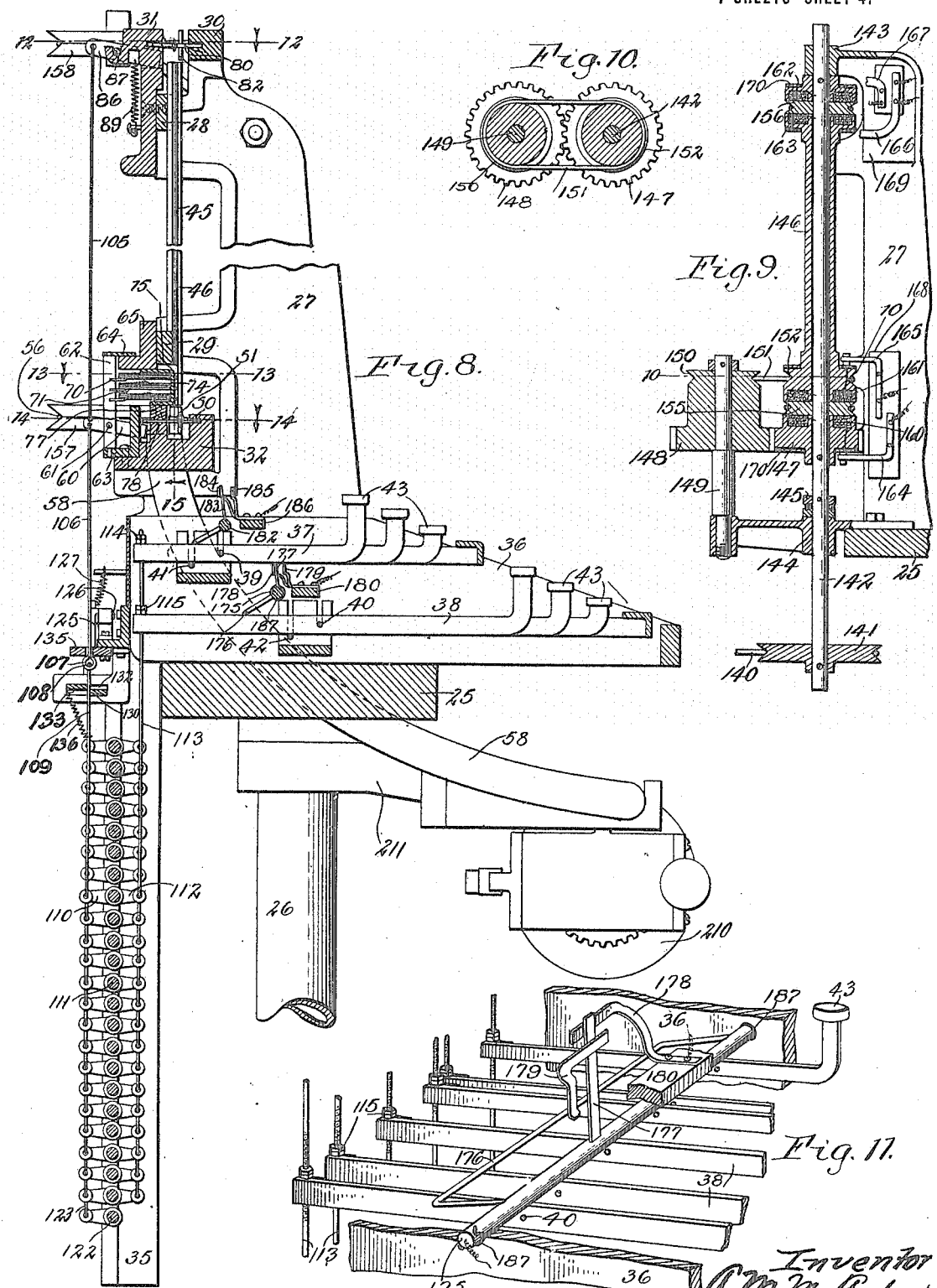

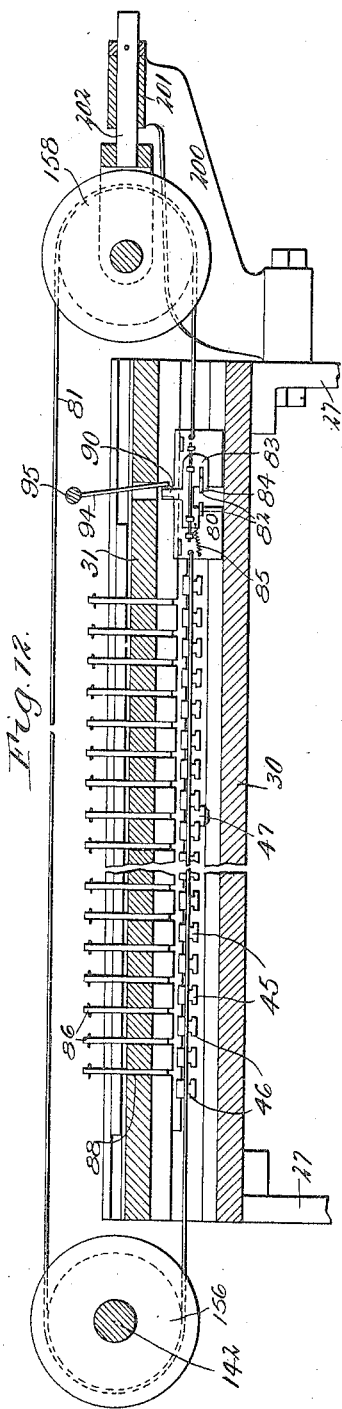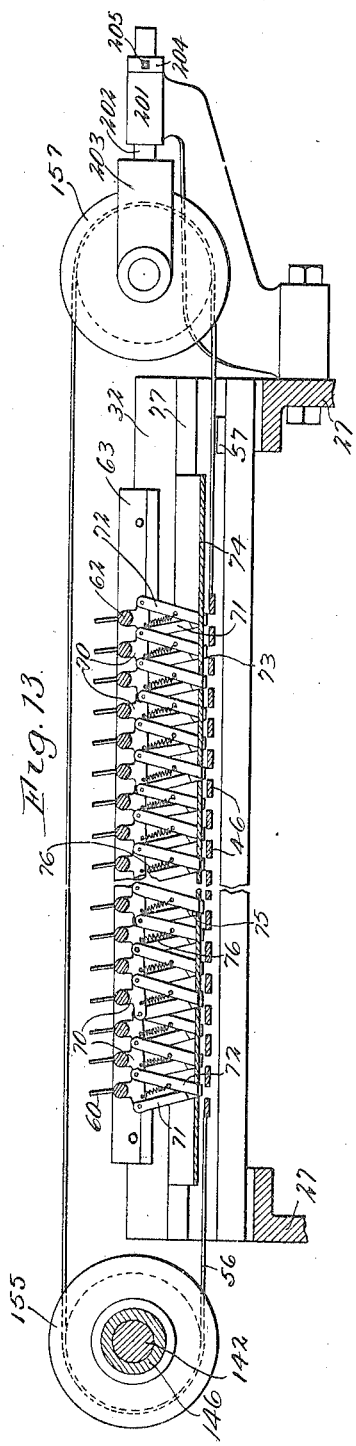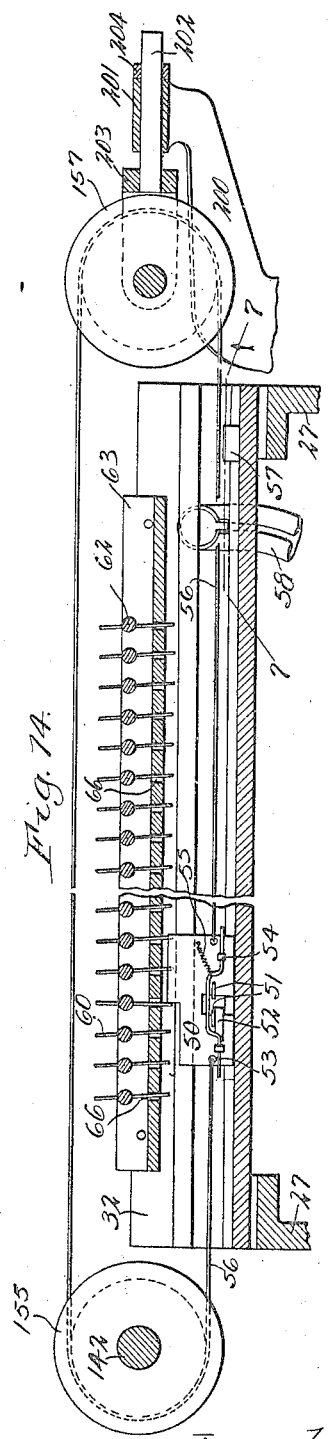

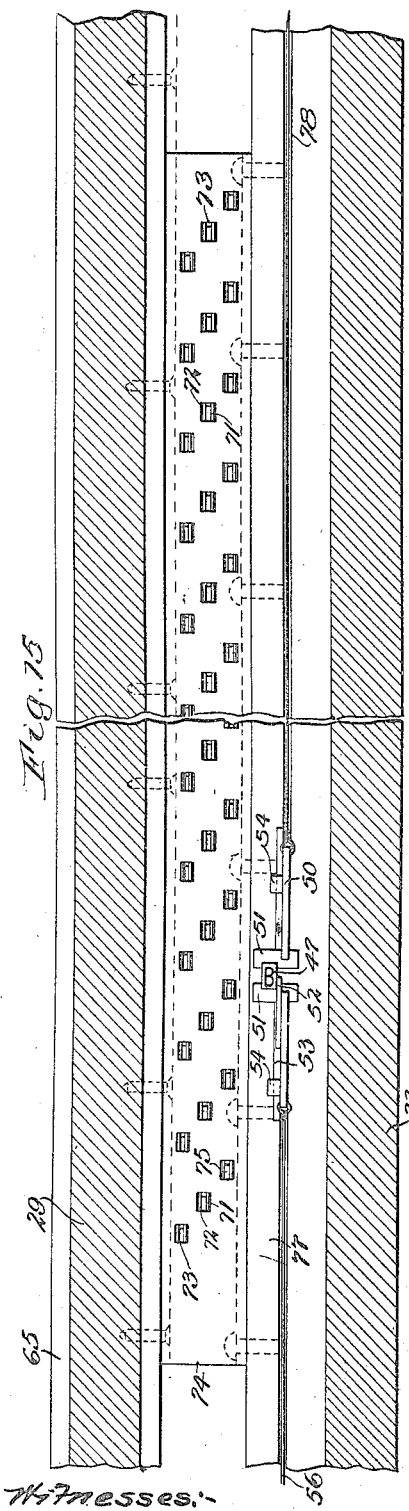

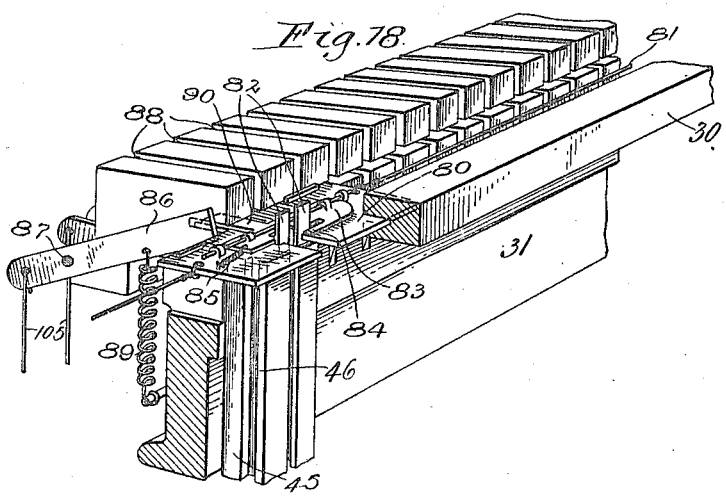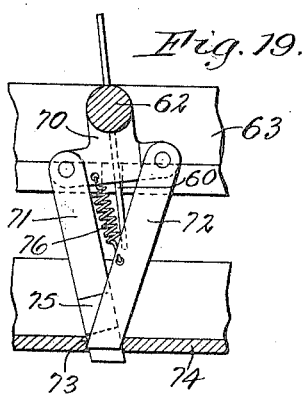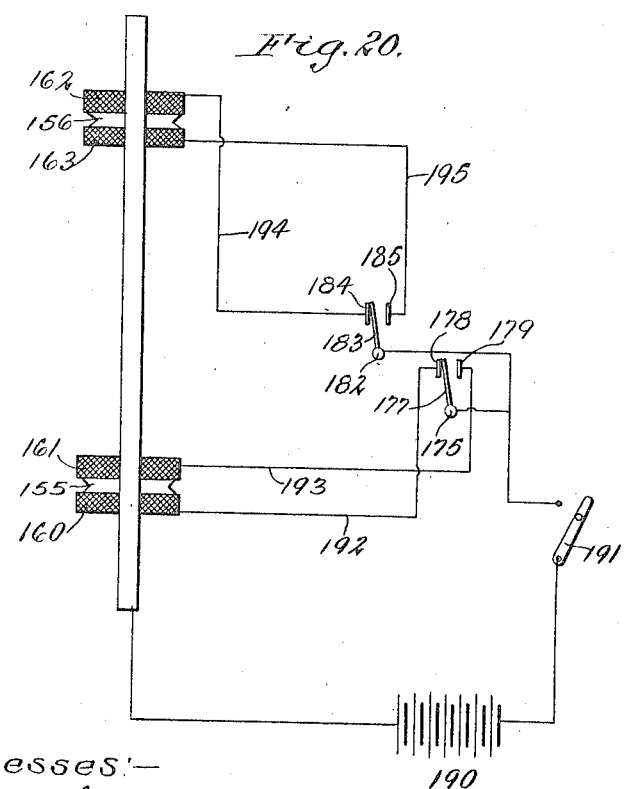

ALLISON M. MacFARLAND, OF BUFFALO, NEW YORK, ASSIGNOR TO KEYBOARD COMPOSITOR CORPORATION, OF BUFFALO, NEW YORK.

TYPE SETTING AND DISTRIBUTING MACHINE.

1,206,452.      Specification of Letters Patent.      Patented Nov. 28, 1916.

Application filed September 11, 1914. Serial No. 861,207.

*To all whom it may concern:*

Be it known that I, ALLISON M. MACFARLAND, a citizen of the United States, residing at Buffalo, in the county of Erie and State of New York, have invented a new and useful Improvement in Type Setting and Distributing Machines, of which the following is a specification.

This invention relates to typesetting and distributing machines of the kind disclosed in my co-pending application No. 777,455, filed July 5, 1913, and which comprise upright type magazine channels in which the type is contained in columns or stacks, and keyboard actuated mechanisms by means of which the type is delivered from the magazines to the assembling point, or by which assembled type is distributed back to the magazines.

One of the objects of the invention is to produce a machine of this kind of improved and simplified construction in which the magazine channels containing the type are all arranged in a straight line, whereby the entire font of type is always before the operator. By so constructing the machine the parts thereof are rendered readily accessible and can be easily cleaned and repaired, the cost of the machine is reduced and the weight of the traveling type carriers is materially decreased so that they can be started and stopped more readily and the machine can be operated at a greater speed.

Among other objects of the invention are to actuate the movable type carriers through the medium of a belt or cord which modifies the shock caused by the stopping of the type carriers; also to provide a machine of this kind with two keyboards, one for setting up type and the other for distributing type, so that no changes or adjustments are required on the machine for performing one or the other operation.

The machine shown in the drawings is adapted to employ a particular kind of type generally used on printing machines employed principally for printing circular or duplicate letters, which type is slotted at opposite faces to adapt it to enter a key hole slot on the type cylinder of a printing machine of this kind, but it will be understood that the machine can easily be adapted to operate on other kinds of type.

In the accompanying drawings, Figure 1 is a front elevation of a typesetting and distributing machine embodying the invention. Fig. 2 is a transverse sectional elevation thereof on line 2—2, Fig. 3, on an enlarged scale. Fig. 3 is a rear elevation of the machine on the same scale as Fig. 1. Fig. 4 is a plan view thereof. Figs. 5 and 6 are fragmentary perspective views, on an enlarged scale, of the type collecting mechanism showing the parts of the escapement mechanism in different positions. Fig. 7 is a fragmentary sectional elevation on line 7—7, Fig. 14, showing the type carrier in position to drop a type into the assembling channel. Fig. 8 is a fragmentary sectional elevation, on an enlarged scale, through the keyboard of the machine. Fig. 9 is a sectional elevation on line 9—9, Fig. 4. Fig. 10 is a sectional view on line 10—10, Fig. 9. Fig. 11 is a fragmentary perspective view of the keyboard, showing means for completing electric circuits to cause the actuation of the type carriers. Figs. 12, 13 and 14 are fragmentary sectional plan views on lines 12—12, 13—13 and 14—14, respectively, Fig. 8. Fig. 15 is a fragmentary sectional elevation on line 15—15, Fig. 8. Fig. 16 is a fragmentary rear elevation of the machine, on an enlarged scale, showing the mechanism for shifting from small letters to capitals and vice-versa. Fig. 17 is a fragmentary sectional plan view thereof on line 17—17, Fig. 16. Fig. 18 is a fragmentary perspective view of the type distributing mechanism. Fig. 19 is a detached view, on an enlarged scale, showing one of the escapement mechanisms. Fig. 20 shows diagrammatically the electrical connections between the various parts of the machine.

The frame of the machine may be of any suitable construction, that shown in the drawings comprising a plate or table 25 on which the parts of the machine are supported, and which is mounted on suitable legs or supports 26. Two standards 27 project upwardly from the table 25 at the sides of the machine and upper and lower magazine supporting bars 28 and 29 extend between the standards. The upper ends of the standards are connected by guide bars or tracks 30 and 31 for the type distributing carrier, and a guide bar 32 for the type collecting carrier is secured to the two standards near the lower portions thereof.

33, 34 and 35 represent bars secured to the table 25 and extending downwardly therefrom.

36 represents a frame for the keyboards which is mounted on the table 25 and in which two sets of key levers 37 and 38 are pivotally mounted at 39 and 40, respectively, and rods 41 and 42 are provided in rear of the pivots and adapted to be engaged by the lower edges of the key levers to limit the upward return movement of keys 43 mounted on the ends of the key levers. The keys are preferably arranged in the same manner on the two keyboards, so that the two key levers for the same character are substantially in vertical alinement.

Keyboards of any other suitable construction may be employed, if desired, those shown in the drawings having only a comparatively small number of keys, sufficient to illustrate the invention.

The magazines in which the type 47 is contained comprise a plurality of upright bars 45 arranged side by side and forming channels between adjacent bars in which the type is contained. The magazine bars are I-shaped in cross section and have outer flanged portions 46, Fig. 12, which engage in the slots in the side of the type forming magazine channels in which the type is contained. The magazine bars are secured to the supporting bars 28 and 29, and a portion of each of the magazine bars below the supporting bar 29 is cut away, so that only the flanged portions 46 of the magazine bars extend below the bar 29. Type magazines or other construction may be employed, if desired, in which the type is inserted at one end and discharged at the other end.

The type is taken one at a time from the bottom of the magazine channels and is carried to the assembling point by means of a type collector or carrier which is slidably arranged on the guide bar 32. This carrier preferably comprises a small plate 50 which is slidably arranged in slots in the guide bar 32 and has two upwardly extending guide strips 51, spaced apart to form a channel in which the type can be held. In the operation of the machine the type collector is stopped below a type magazine channel, so that the slot between the guide strips 51 is in alinement with the space between adjacent flanges of the magazine bars, and a type dropped from the magazine channel will drop into the slot between the guide strips 51, as shown in Fig. 6. The type is held from falling through the channel between the guide strips 51 by any suitable means, such as a latch consisting of a type holding arm 52 secured on a wire 53, the opposite ends of which are slidably held in lugs 54 on the plate 50, and the intermediate portion of which is bent so as not to interfere with the passage of the type through the slot between the guide strips. The latch is yieldingly held by a spring 55 in the position in which the arm 52 of the latch intercepts the type. The type collector is connected to a cord or belt 56 which is preferably made of a more or less elastic material and by means of which it is moved back and forth on the guide bar 32, as will be hereinafter explained.

When the type collector reaches the end of its movement, it engages a stop 57 on the guide bar in such a manner that the wire 53 of the latch will be pushed against the action of the spring 55, as indicated in Figs. 7, 13 and 14, thus causing the latch to release the type in the collector and permit it to drop into a type collecting channel or holder 58.

The type collector is stopped in operative relation to any one of the type magazine channels by means of stop levers 60 pivoted at 61 and adapted to be swung into position to engage with the type collector for stopping the same. Each stop lever is operatively connected with an escapement mechanism which is adapted to release the type one at a time from the magazine under which the type collector is stopped. In the construction shown for this purpose, the stop levers are pivoted on upright rock shafts 62, Figs. 5 and 6, journaled at their lower ends on a bar 63 secured to the guide bar 32 of the type collector, and at their upper ends in a bar 64 which is secured to an angle-shaped support 65 mounted on the standards 27 of the machine. The supporting bar 63 for the rock shaft has an upwardly extending flange provided with a plurality of slots 66 through which the stop levers 60 extend, and which limit the movement of the stop levers and consequently that of the rock shaft, when the stop levers are engaged by the type collector.

The escapement mechanism which controls the discharge of type from a type magazine channel to the type collector, comprises a yoke 70 rigidly secured on the rock shaft 62 and having type-engaging arms 71 and 72 pivoted at the opposite ends of the yoke. The free ends of these arms extend through and are confined in guide slots 73 formed in a guide bar 74 which is secured to the support 65. The free ends of the type-engaging arms 71 and 72 are spaced apart by means of a block 75 so that the space between the ends of the type-engaging arms is substantially equal to the width of the type. A tension spring 76 connects the yoke 70 with the arm 72 and yieldingly draws the arm 72 toward the yoke 70. Since the outer end of the arm 72 is confined in the slot 73, the spring will cause the rock shaft 62 to turn and thereby move the arm 71 toward the type magazine channel to support the column of type therein. When the type collector strikes the stop lever 60 the rock shaft 62 is swung on its pivots against the action of the spring 76 in such a manner as to withdraw the arm 71 from its type-engaging position and at the same time swing the arm 72 into engagement with the second type from the bottom of the column. This permits the lowest type in the column to drop into the type collector. When the type collector moves out of engagement with the stop lever the escapement mechanism is again returned to its normal position by its spring 76, the arm 72 being withdrawn from engagement with the column of type and the arm 71 being again moved into its supporting position, so that the column of type in the type magazine channel drops through a space equal to the width of one type and is then again supported by the arm 71. Escapement mechanisms of other construction may be used, if desired. An escapement mechanism is provided for each magazine channel, and in the construction shown, see particularly Figs. 8 and 15, the yokes 70 are secured to the rock shafts 62 at different elevations, forming a staggered arrangement which enables the machine to be constucted in a compact manner.

77 represents a bar or extension secured to the lower edge of the guide bar 74 and extending into close proximity to the guide bar 32 of the type collector forming with the guide bar a narrow space or slot 78 in which the type collector is confined in its movement.

The type is distributed back to the magazines by means of a type distributer or carrier slidable in the guide bars 30 and 31. This type distributer, Fig. 18, comprises a plate 80 slidable in slots in the guide bars and adapted to be moved back and forth through the medium of a cord or belt 81 secured to the opposite ends of the plate. The type distributer has upright guides 82 adapted to receive the type, which is prevented from falling through the guides by means of a holding plate or latch 83 slidably arranged on the plate 80. The holding plate has an arm 84 extending across the slot between the guides 82 into the path of movement of the type to intercept the same; the plate being yieldingly held in its intercepting position by a spring 85. The type distributer can be stopped in operative relation to any one of the type magazines by means of stop levers 86 pivoted at 87 on the guide bar 31. The stop levers are arranged in vertical slots 88 in the guide bar 31 and are normally held below the path of movement of the type distributer by springs 89 but may be swung on their pivots to engage the type distributer, as shown in Fig. 18. When the type distributer is in operative relation to a type magazine channel the type held therein is released from the distributer by an arm 90 of the movable holding plate 83, which engages the stop lever 86 and moves the holding plate against the action of the spring 85 to move the type-engaging arm 84 out of its type-holding position. The type then drops through the slot between the guide 82 into the type magazine channel. A type carrier of other construction, and other means for releasably holding the type in the carrier may be employed, if desired.

The assembled type to be distributed is placed in a holder or type channel 92 secured on the machine above the path of movement of the type distributer. In the construction shown in the drawings, the type channel is secured at its lower end to the frame of the machine and is supported at its upper end by suitable brackets 93. When the type distributer approaches its operative position underneath the type channel 92 it engages a stop arm 94 rigidly secured on an upright pin 95 pivoted at its lower end in the frame of the machine and at its upper end in a plate 96 secured to the brackets 93. An escapement mechanism 97 similar to those already described is operatively connected with the pin 95 and releases the type from the channel 92 one at a time when the type distributer engages the stop arm 94.

98 represents a movable type channel by means of which the type is taken from the printing cylinder and placed in the fixed channel 92. The movable channel 98 is adapted to enter a recess 99 in the plate 96 and is held in place therein and in alinement with the fixed channel 92 by an arm 100 engaging in a hole 101 in the plate 96.

102 represents an enlarging lens which may, if desired, be placed in front of the lowest type in the type channel 92 so that the operator can readily distinguish the letters on the type that is distributed into the magazines. The lens shown is supported from the frame of the machine by a bracket 103.

The stop levers 60 and 86 are operatively connected with the keyboards of the machine so that the type collector or the type distributer can be stopped at any of the magazine channels by depressing the proper key. In the construction shown for this purpose, Figs. 1, 3 and 8, the two stop levers of each magazine channel are connected by a link 105 so that both stop levers will be actuated by depressing one key. The stop lever 60 is connected to a link 106 having an eye 107 formed in the lower end thereof and which is engaged by a hook 108 formed on the upper end of a link 109. The lower end of the link 109 is connected to an arm 110 secured to one of a plurality of rock shafts 111 journaled on the downwardly extending supports 33, 34 and 35 of the machine. Each rock shaft has another arm 112 which is connected by means of a link 113 to a pair of corresponding key levers 37 and 38. The connection between the link 113 and the key levers 37 and 38 is such that the link can be actuated by either key lever without actuating the other key lever. In the construction shown, this is accomplished by providing holes in the ends of the key levers through which the link extends. The link 113 is provided with nuts or stops 114 and 115 located at the upper faces of the key levers and which prevent the link from passing downwardly through the holes in the key levers and which leave the link free to move upwardly through the holes. Consequently if the key lever 37 is depressed the end thereof engaging the nuts 114 will draw the link 113 upwardly. During this upward movement the link moves freely through the hole in the key lever 38 and does not change the position of the same. By moving the link 113 upwardly the rock shaft 111 to which the link is connected, will be swung on its axis so that the stop levers 60 and 86 will be moved into their engaging position throuh the medium of the links 105, 106 and 109. The rock shafts 111 extend substantially throughout the length of the machine and the arms 112 thereof are located beneath the keyboards in vertical alinement with the keys to which they are connected, and the arms 110 are arranged in substantially vertical alinement with the type magazine channels with which they coöperate. In this manner the removal of the type from, or distribution to, the magazine channels can be readily controlled from the keyboard regardless as to the distance of the type magazine channels from the keyboards.

The machine is preferably so constructed that more than one character can be controlled by the same key, for example, the type for a capital letter is preferably controlled by the same key which controls the type for the corresponding small letter. In the construction shown, this is accomplished by means of a shift key lever 120 on each keyboard. These levers are connected by means of a link 121 to an arm of a rock shaft 122. The other arm of the rock shaft is connected by means of a link 123 to one arm 124 of a bell crank lever 125, Figs. 3, 16 and 17, which is pivoted at 126 on the frame of the machine. This lever is normally held in the position shown in Fig. 3 by means of a spring 127 and is secured to a rigid arm 128 extending rearwardly from the frame of the machine. The other arm of the bell crank lever is pivotally connected to a standard 129 mounted on a shift bar 130. The shift bar is slidably supported in brackets 131 secured on the frame of the machine. The shift bar engages each of the links 109 in such manner that they are free to move vertically. In order to facilitate the construction of the machine the bar is made in two parts, one part having slots 132 extending from the center of the bar to one edge thereof, and the other bar having slots 133 extending from the center to the opposite edge thereof. In assembling the machine the links 109 are inserted in the two slotted parts of the shift bar, and these parts are then moved into alinement with each other so that the links 109 are held by the inner ends of the slots, as shown in Figs. 8 and 17.

The hooked ends of some of the links 109 face in one direction and the hooked ends of the other links face in the opposite direction, so that when the shift bar is shifted to one position some of these hooks will be moved into engagement with the eyes 107 of the corresponding links 106, while the hooks facing the opposite direction will be moved out of engagement with the eyes of the links with which they coöperate. In this manner one or another set of links is placed into operation by the actuation of the shift lever. The movement of the shift bar to the right of Fig. 16 is limited by means of a pin 134 extending through the shift bar and adapted to engage with one of the brackets 131.

135 represents a guide bar having a plurality of holes through which the links 106 pass and which holds the lower ends of these links in position to be engaged by the hooked ends of the links 109. Springs 136 hold the links 109 in their upper positions when disconnected from the links 106. Any other means for engaging the links 109 for moving them into and out of engagement with the links 106 may be employed, if desired. In the construction illustrated, each pair of key levers is connected to a rock shaft 111 and each rock shaft is connected to two links 109 having their hooked ends 108 facing in opposite directions, so that only one of the two links 109 will be in engagement with a link 106 at one time. Thus by means of the shift lever one or the other stop lever for a magazine channel can be actuated at one time, so that each key controls two characters.

Any suitable means actuated by the depressing and the releasing of the key levers may be employed for moving the type carriers back and forth between the magazines and the points from which the type is taken or in which it is assembled. In the construction shown, movement is imparted to the type carriers from any suitable source of power, such as an electric motor (not shown), connected by means of a belt 140 to a pulley 141 on a driving shaft 142. This shaft is journaled at its upper end in a bearing 143 on the frame of the machine, and at its lower end in a bracket 144 secured on the table 25.

145 represents a collar bearing which limits the downward movement of the shaft in its vertical bearings.

146 represents a sleeve which is mounted on the shaft 142 and which rotates thereon in the opposite direction from the drive shaft 142. The sleeve 146 may be rotated in any suitable manner, for example, by means of a gear 147 on the drive shaft, which cooperates with a gear 148 journaled on a pin 149 secured on the bracket 144. The gear 148 has a grooved portion 150 adapted to receive a belt 151 which passes around a similar grooved portion 152 on the sleeve 146. In this manner the sleeve 146 will be rotated from the drive shaft 142 in a direction opposite to the direction of rotation of the drive shaft.

The cords or belts 56 and 81 to which the type collector and the type distributer are connected, pass around pulleys 155 and 156 respectively, which are journaled on the drive shaft 142 and around idler pulleys 157 and 158 which are journaled at the opposite side of the machine. The pulleys 155 and 156 constitute the armatures of electromagnetic clutches and are adapted to be rotated in either direction to move the type carrier back and forth, as desired. In the construction shown, the pulley 155 is arranged between a clutch member 160 mounted on the shaft 142 and a clutch member 161 formed on the sleeve 146. When the clutch member 160 is energized, the pulley 155 is driven from the shaft 142, and when the clutch member 161 is energized, the pulley 155 is driven in the opposite direction from the sleeve 146. In the same manner the pulley 156 is driven either from the shaft 142 by means of a clutch member 162 secured thereto, or from the sleeve 146 by means of a clutch member 163 secured to the sleeve. Current is conducted to the clutch members 160, 161, 163 and 162 by means of fixed conductors 164, 165, 166 and 167 on insulating panels 168 and 169, each of which is suitably connected with one of the magnetizing coils of the clutch members, for example, by means of contact rings 170 mounted on the clutch members and insulated therefrom. Each contact ring is connected with one terminal of the magnetizing coil of its corresponding clutch member, and the other terminal of each of the coils is grounded on the sleeve 146 or shaft 142.

The clutch members 160 and 161 are energized by the depressing or releasing of any key lever of the keyboard which controls the type collecting operation of the machine, and the clutch members 163 and 162 are energized from the keyboard controlling the distribution of type back to the magazines. In the construction shown, the lower keyboard operates the type collector and the upper keyboard operates the type distributer. The lower keyboard, Fig. 11, is provided with a rock bar 175 suitably journaled at its ends in the keyboard frame 36, and which has a laterally extending portion 176 resting on the key levers, so that when any one of the key levers is actuating, the rock bar 175 will be swung on its axis. The rock bar is provided with a contact arm 177 adapted to engage with a fixed contact 178 when the key levers are in their normal positions, and to engage with a fixed contact bar 179 when the rock bar is swung by the actuation of a key lever. The fixed contacts are suitably mounted on a supporting bar 180 and insulated from each other.

A similar mechanism is employed in connection with the upper keyboard, see Fig. 8, comprising a rock bar 182 having a contact arm 183 adapted to engage with fixed contacts 184 and 185 mounted on a supporting bar 186. The rock bars 175 and 182 are insulated from the frame of the machine in any suitable manner, for example, by insulating bushing 187.

The electrical connections between the various parts of the machine are shown diagrammatically in Fig. 20, in which 190 represents a battery or other suitable source of power, one terminal of which is grounded on the part of the driving mechanism of the machine and the other terminal of which is connected through a switch 191 to the contact arms 177 and 183. The fixed contact 178 of the lower keyboard is connected by a conductor 192 with the lower clutch member 160 of the type collector, and the fixed contact 179 is connected by a conductor 193 with the upper clutch member 161 of the type collector. The fixed contact 184 is connected by a conductor 194 to the upper clutch member 162 of the type distributer, and the fixed contact 185 is connected by conductor 195 with the clutch member 163. Thus by depressing a key of the lower keyboard, the circuit is closed to cause the clutch member 161 to move the type collector to engagement with the stop lever actuated by the key, and when the key is released the clutch member 160 returns the type collector to the stop 57 which causes it to drop the type. When a key of the upper keyboard is depressed, the type distributer is moved to the stop lever actuated by the key by means of the clutch member 162, and when the key is released the clutch member 162 returns the type distributer to its type receiving position. When the type carriers engage with the stop levers, either the pulleys will slip on the clutch members with which they are in engagement or the belts or cords connecting the pulleys with the type carriers will slip on the pulleys, so that the type carriers are prevented from rebounding by the friction between the belts, pulleys and friction members.

In order to adjust the tension of the belts, the idler pulleys 157 and 158 are preferably adjustably mounted on brackets 200 secured to the frame of the machine. Each bracket has a tubular bearing portion 201 through which a pin 202 is adjustably supported. The pin 202 is rigidly connected with a forked bearing portion 203 in which the pulley is journaled. The pin is held in the tubular bearing portion by means of a collar 204 adjustable on the pin 202 and adapted to be held in place thereon by a set screw 205.

210 represents the cylinder of a printing press which may, if desired, be rotatably mounted on the table 25 of the machine so that the type from the type collecting channel 58 can be inserted directly into the channels of the type cylinder. The type cylinder is removably mounted on brackets 211 and 212 and is adapted to be turned on its bearings by means of a pinion 213 engaging a gear 214 formed on the type cylinder. Any other means for mounting the cylinder on the machine may be employed, and any device adapted to receive the type may be employed in place of the cylinder.

The machine described has the advantage that all the type magazines are in front of the operator so that he can readily see if one of the magazine channels is empty. By so constructing the machine that only one type is carried at a time and by making the type carriers light in weight, the machine can be operated at a high rate of speed without causing the momentum of the carriers to become excessive or injurious to the machine. The elasticity of the belt serves to absorb a part of the shock caused by the stopping of the carriers. The tension of the belt, furthermore, can be regulated as desired, to control the shock caused by the impact of a carrier with a stop and the speed with which the carrier starts. The carriers being driven by frictional means do not rebound when they strike a stop, so that the machine is reliable in operation. The machine can be constructed at a moderate cost and all parts thereof are readily accessible for inspection and repairs.

In the machine shown in the drawings, the type magazine channels are arranged in a straight line, but it is not intended to limit the invention to such arrangement since other arrangements could be employed.

I claim as my invention:

1. In a type setting machine, the combination of a plurality of upright stationary type magazine channels arranged substantially in a straight line, a stationary type holder arranged in line with said magazine channels, a type carrier adapted to be moved into operative relation with the lower end of any of said type magazine channels and having a receptacle adapted to contain one type at a time and to carry the type to said holder and means for dropping a type into said carrier while the same is in operative relation to a type magazine channel.

2. In a type setting machine, the combination of a plurality of stationary type magazine channels arranged substantially in a straight line, a type holder, a type carrier movable back and forth between said magazine channels and said holder and having a receptacle adapted to carry one type at a time from the channels to the holder, and means on said channels for dropping a type into said carrier when the same is in operative relation to said channels.

3. In a type setting machine, the combination of a plurality of upright stationary type magazine channels arranged substantially in a straight line, a type holder, a type carrier movable from the holder to the type magazine and having a receptacle adapted to carry one type at a time therefrom, means for dropping a type into said carrier when the same is in operative relation to a type magazine channel, means on said channels for placing a type into said carrier, and means for reversing the direction of movement of said carrier to move the same to said holder to drop the type therein.

4. In a type setting machine, the combination of a plurality of upright stationary type magazine channels, a stationary type holder, a type carrier movable back and forth between said magazine channels and said holder and having a receptacle adapted to carry one type at a time and to carry the type from said channels to said holder, means on said channels which are engaged by said carrier to release a type and drop the same into said carrier, and means for guiding said carrier in its movement.

5. In a type setting machine, the combination of a plurality of upright stationary type magazine channels, a stationary type holder having a substantially upright portion adapted to receive type, a type carrier having a receptacle adapted to carry one type at a time from the lower ends of said magazines to said upright portion of the holder, an escapement on each of said magazine channels adapted to be actuated by said carrier when in operative relation to a channel to drop a type into the carrier, a track for guiding said carrier into operative relation to said channels and said holder, and means for moving said type carrier back and forth in said guide means.

6. In a type setting machine, the combination of a plurality of upright stationary type magazine channels, a stationary type holder, a type carrier movable back and forth between the lower ends of said magazine channels and said holder to carry type one at a time from said channels to said holder, an escapement on each of said magazine channels adapted to be actuated by said carrier when in operative relation to a channel to drop a type into the carrier, a latch on said carrier to drop the type from the carrier to said holder, means for guiding said carrier into operative relation to the lower ends of said channels and said holder, and means for stopping said carrier in said guide means in operative relation to the bottom of a type magazine channel to receive a type therefrom.

7. In a type setting machine, the combination of a plurality of upright stationary type magazine channels, a type carrier movable into operative relation to the lower ends of said channels to receive type therefrom, a track for guiding the type carrier into operative relation to said channels, keyboard actuated means for moving said carrier to and stopping said carrier at the bottom of a channel and means for dropping a type from said magazine channel into said carrier when the same has been stopped in operative relation to said channel.

8. In a type distributing machine, the combination of a plurality of upright stationary type magazine channels arranged substantially in a straight line, a stationary type holder arranged in line with said magazine channels, a type carrier adapted to be moved to the type holder to receive a type therefrom and above the upper ends of any one of said magazine channels to place the type therein, means for stopping said carrier at any of said magazine channels, and a latch actuated by said stop means for dropping type into said channel.

9. In a type distributing machine, the combination of a plurality of stationary type magazine channels, a stationary type holder, a type carrier movable back and forth between said holder and said magazine channels, means for feeding a single type to said carrier when in operative relation to said holder, means for guiding said carrier into operative relation to the upper ends of said channels and to said holder, and means for stopping said carrier in said guide means in operative relation to said channels and to said holder, the stop means of said holder causing the actuation of said feeding means, and the stop means of said channels causing the type to be dropped from said carrier to said magazines.

10. The combination of a plurality of stationary type magazine channels, a carrier adapted to move into operative relation to said channels, a rotatable driving pulley, a flexible connecting means between said carrier and said pulley, and means for positively stopping said carrier and causing said connecting means to slip while said driving pulley continues to rotate.

11. The combination of a plurality of stationary type magazine channels, a carrier adapted to move into operative relation to said channels, a movable actuating member for imparting movement to said carrier, a slidable frictional connection between said carrier and said actuating member, and means for stopping said carrier without interrupting the movement of said actuating member whereby the frictional engagement of said connection with said member prevents rebound of said carrier.

12. The combination of a plurality of stationary type magazine channels, a carrier adapted to move into operative relation to said channels, clutch members rotatable in opposite directions, a pulley adapted to be frictionally engaged by either of said clutch members, and means connecting said pulley with said carrier for moving the same to and from said magazine channels.

13. The combination of a plurality of stationary type magazine channels, a carrier adapted to move into operative relation to said channels, a belt connected with said carrier for moving the same to and from said channels, frictional means for actuating said belt and a keyboard for actuating said frictional means and for placing a stop in the path of movement of said carrier to stop said carrier while said frictional means continue to operate.

14. The combination of a plurality of stationary type magazine channels, a carrier adapted to move into operative relation to said channels, a belt connected with said carrier for moving the same to and from said channels, frictional means for actuating said belt, and keyboard-operated means for positively stopping the carrier in operative relation to a magazine channel while said frictional means continue to operate.

15. The combination of a plurality of stationary type magazine channels, a carrier adapted to move into operative relation to said channels, a belt connected with said carrier for moving the same to and from said channels, frictional means for actuating said belt, means for stopping the carrier in operative relation to a magazine channel while said frictional means continue to operate, a keyboard having keys which are operatively connected with said stopping means, and means actuated by said keys for actuating said frictional means in opposite directions.

16. The combination of a plurality of stationary type magazine channels, a carrier adapted to move into operative relation to said channels, a belt connected to said carrier, an electromagnetic clutch having a movable member adapted to actuate said belt in either direction and means for stopping said carrier independently of said clutch.

17. The combination of a plurality of stationary type magazine channels, a carrier adapted to move into operative relation to said channels, a belt connected to said carrier, an electromagnetic clutch having a movable member adapted to actuate said belt in either direction, a keyboard, and electrical connections between said keyboard and said clutch for causing the actuation of said belt.

18. The combination of a plurality of stationary type magazine channels, a carrier adapted to move into operative relation to said channels, a belt connected to said carrier, a drive shaft, an electric clutch member rigidly secured on said drive shaft, a second clutch member journaled on said shaft and adapted to be driven in the direction opposite to that in which the shaft turns, and an armature adapted to be driven by either of said clutch members and connected to said belt for driving the same.

19. The combination of a plurality of stationary type magazine channels, a carrier adapted to move into operative relation to said channels, a belt connected to said carrier, a drive shaft, an electric clutch member rigidly secured on said drive shaft, a second clutch member journaled on said shaft, means connecting said shaft and said second clutch member for driving the same in the reverse direction, and an armature adapted to be driven by either of said clutch members and connected to said belt for driving the same.

20. The combination of a plurality of stationary type magazine channels, a carrier adapted to move into operative relation to said channels, a belt connected to said carrier, a driven pulley adapted to impart movement to said belt, an idler pulley engaging said belt and adjustably mounted to vary the tension of said belt and means for stopping said belt independently of said driven pulley.

21. The combination of a plurality of stationary type magazine channels arranged substantially in a straight line, a carrier movable into operative relation to said channels, a belt connected with said carrier, a driven pulley located near one end of the line of channels, an idler pulley located near the other end of the said line, means for adjusting the position of said idler pulley for varying the tension of said belt, and means for stopping said belt independently of said driven pulley.

22. In a typesetting and distributing machine, the combination of a plurality of type magazine channels, a type collector adapted to take type from the magazines, a type distributer adapted to place type into the magazines, a keyboard for controlling the movement of said type collector, and a second keyboard for controlling the movement of said type distributer.

23. In a type setting and distributing machine, the combination of a plurality of type magazine channels, a type collector adapted to take type from the magazines, a type distributer adapted to place type in the magazines, a keyboard for actuating said type collector, a second keyboard for actuating said type distributer, and means actuated by the keys of the keyboards for stopping the type collector and the type distributer in operative relation to a magazine channel.

24. In a typesetting and distributing machine, the combination of a plurality of type magazine channels, a type collector adapted to take type from the magazines, a type distributer adapted to place type into the magazines, a keyboard for actuating said type collector, a second keyboard for actuating said type distributer, stops for each magazine channel in the path of movement of said type collector and said type distributer, and a connection between corresponding keys of the two keyboards and the two stops of a magazine channel.

25. The combination of a keyboard comprising a plurality of keys, a plurality of type magazine channels, a carrier movable into operative relation to the channels, means actuated by said keys for stopping said carrier in operative relation to a magazine channel, means adapted to connect each key with a plurality of stop means, and mechanism for establishing a connection between a key and one or another of said stops and for breaking the connection between said key and the other stop means.

26. The combination of a keyboard comprising a plurality of keys, a plurality of type magazine channels, a carrier movable into operative relation to the channels, a stop at each magazine channel for stopping said carrier in operative relation to the channel, links adapted to connect a plurality of stops with each key, and mechanism for connecting one stop at a time with said key.

27. The combination of a keyboard comprising a plurality of keys, a plurality of type magazine channels, a carrier movable into operative relation to the channels, a stop at each magazine channel for stopping said carrier in operative relation to the channel, links adapted to connect a plurality of stops with each key, and a member engaging said links for moving one link at a time into engagement with said key.

28. The combination of a keyboard comprising a plurality of keys, a plurality of type magazine channels, a carrier movable into operative relation to the channels, stop levers adapted to intercept the carrier for stopping the same in operative relation to said magazine channels, a link connected with each key, and a shift bar connected with said links for operatively connecting some of said links with said levers and disconnecting other links therefrom.

29. The combination of a keyboard comprising a plurality of keys, a plurality of type magazine channels, a carrier movable into operative relation to the channels, stop levers adapted to intercept the carrier for stopping the same in operative relation to said magazine channels, a link connected with each key, means on said levers and said links for connecting and disconnecting the same, a shift bar for actuating said connecting means for connecting some of said levers with said links and disconnecting other links therefrom.

30. The combination of a keyboard comprising a plurality of keys, a plurality of type magazine channels, a carrier movable into operative relation to said channels, means for stopping said carrier in operative relation to any channel, and means connecting said keys and said stopping means including rock bars adapted to be actuated by said keys and connections between said rock bars and stop means.

31. The combination of a keyboard comprising a plurality of keys, a plurality of type magazine channels, a carrier movable into operative relation to said channels, means for stopping said carrier in operative relation to any channel, and means connecting said keys and said stopping means including rock bars operatively connected with said keys, each rock bar being operatively connected with the stop means of a corresponding magazine channel.

32. The combination of a keyboard comprising a plurality of keys, a plurality of type magazine channels, a carrier movable into operative relation to said channels, means for stopping said carrier in operative relation to any channel, and means connecting said keys and said stopping means including rock bars extending lengthwise of the machine, connections between said keys and said rock bars, said connections being substantially in vertical alinement, and means arranged systematically in vertical alinement with said stop means for connecting said stop means and said rock bars.

33. The combination of a keyboard comprising a plurality of keys, a plurality of type magazine channels, a carrier movable into operative relation to said channels, means for stopping said carrier in operative relation to any channel, and means connecting said keys and said stopping means, including rock bars, means for connecting each of said bars to more than one of said stop means, connections between said rock bars and said keys, and means for controlling the connection between said rock bar and said stop means for connecting the stop means of one magazine channel to said rock bar at one time.

34. The combination of a keyboard comprising a plurality of keys, a plurality of type magazine channels, a carrier movable into operative relation to said channels, means for stopping said carrier in operative relation to any channel, and means connecting said keys and said stopping means, including rock bars connected with the keys, links adapted to connect the rock bars with said stopping means, and means engaging said links for connecting or disconnecting the rock bars with said stop means.

35. The combination of a keyboard comprising a plurality of keys, a plurality of type magazine channels, a carrier movable into operative relation to said channels, means for stopping said carrier in operative relation to any channel, and means connecting said keys and said stopping means, including rock bars connected with the keys, links having parts adapted to connect the rock bars with said stopping means, and a shift bar connected with said links and adapted to move the links into and out of connection with said stop means.

36. The combination of a magazine channel adapted to contain a column of type, a movable type carrier adapted to take type from said channel, and an escapement mechanism adapted to engage the type and discharge the same from the channel one at a time, said escapement mechanism including a pivotally mounted member, an arm connected to said member at one side of the pivotal axis thereof and adapted to support the column of type, a second arm connected to the member at the other side of the center and adapted to engage the second lowest type of the column, said member being swung on its axis by impact with said carrier to cause said column supporting arm to withdraw from its supporting position and to cause the other arm to engage the second lowest type, and means for returning the member and arms to their original positions.

37. The combination of a magazine channel adapted to contain a column of type, a movable type carrier adapted to take type from said channel, and an escapement mechanism adapted to engage the type and discharge the same from the channel one at a time, said escapement mechanism including a pivotally mounted member, an arm connected to said member at one side of the pivotal axis thereof and adapted to support the column of type, a second arm connected to the member at the other side of the center and adapted to engage the second lowest type of the column, means for swinging the member on its axis to cause said column supporting arm to withdraw from the supporting position and to cause the other arm to engage the second lowest type, and a spring connecting one of said arms to said member for returning said escapement mechanism to its original position.

38. The combination of a magazine channel adapted to contain a column of type, a movable type carrier adapted to take type from said channel, and an escapement mechanism adapted to engage the type and discharge the same from the channel one at a time, said escapement mechanism including a pivotally mounted member, an arm connected to said member at one side of the pivotal axis thereof and adapted to support the column of type, a second arm connected to the member at the other side of the center and adapted to engage the second lowest type of the column, a part adapted to be engaged by said carrier to swing said member on its axis to cause said column supporting arm to withdraw from the supporting position and to cause the other arm to engage the second lowest type, and a spring connecting one of said arms to said member for returning said escapement mechanism to its original position.

39. The combination of a magazine channel adapted to contain a column of type, a movable type carrier adapted to take type from said channel, and an escapement mechanism adapted to engage the type and discharge the same from the channel one at a time, said escapement mechanism including a pivotally mounted member, an arm connected to said member at one side of the pivotal axis thereof and adapted to support the column of type, a second arm connected to the member at the other side of the center and adapted to engage the second lowest type of the column, a part connected with said member adapted to be engaged by said carrier for stopping the carrier and for swinging said member on its axis to cause said column supporting arm to withdraw from the supporting position and to cause the other arm to engage the second lowest type, and a spring connecting one of said arms to said member for returning the member and arms to their original positions.

40. The combination of a magazine channel adapted to contain a column of type, a movable type carrier adapted to take type from said channel, and an escapement mechanism adapted to engage the type and discharge the same from the channel one at a time, said escapement mechanism including a pivotally mounted member, an arm connected to said member at one side of the pivotal axis thereof and adapted to support the column of type, a second arm connected to the member at the other side of the center and adapted to engage the second lowest type of the column, a part movably connected with said pivoted member and adapted to be moved into the path of movement of the carrier for stopping the carrier, the contact of the carrier with said part swinging said pivoted member on its axis to cause said column supporting arm to withdraw from its supporting position and to cause said other arm to engage the second lowest type, and means for returning the member and arms to their original positions.

41. In a type collecting and distributing machine, the combination of a plurality of type magazine channels, a type distributer adapted to carry type to said channels, a type collector adapted to carry type from said channels, a keyboard for actuating said type distributer, a keyboard for actuating said type collector, and means connected with both of said keyboards for stopping said type distributer or said type collector in operative relation to a type magazine channel.

42. In a type collecting and distributing machine, the combination of a plurality of type magazine channels, a type distributer adapted to carry type to said channels, a type collector adapted to carry type from said channels, a keyboard for actuating said type distributer, a keyboard for actuating said type collector, stop means in operative relation to each magazine channel adapted to be actuated to stop the type distributer or the type collector in operative relation to a magazine, and a connection between each of said keyboards and said stop means for operating the same from either keyboard.

Witness my hand in the presence of two subscribing witnesses.

ALLISON M. MacFARLAND.

Witnesses:
F. E. Prochnow,
A. L. McGee.